(12) United States Patent
Black

(10) Patent No.: US 6,434,376 B1
(45) Date of Patent: Aug. 13, 2002

(54) SLOTTED IDLE MODE FOR DUAL MODE SUBSCRIBER STATIONS

(75) Inventor: Peter J. Black, La Jolla, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/248,961

(22) Filed: Feb. 12, 1999

(51) Int. Cl.⁷ ................................................. H04B 1/16
(52) U.S. Cl. ...................................... 455/343; 375/224
(58) Field of Search ................................. 455/574, 343, 455/38.3, 422, 425, 575, 550; 375/340, 224, 346, 347, 365, 366

(56) References Cited

U.S. PATENT DOCUMENTS

| | | | |
|---|---|---|---|
| 5,175,874 A | * 12/1992 | Auchter | 455/574 |
| 5,568,513 A | * 10/1996 | Croft et al. | 375/224 |
| 5,678,227 A | * 10/1997 | Connell et al. | 455/343 |
| 5,745,860 A | * 4/1998 | Kallin | 455/574 |
| 5,752,201 A | * 5/1998 | Kivari | 455/574 |
| 5,835,023 A | * 11/1998 | Ito et al. | 340/7.2 |
| 5,857,146 A | * 1/1999 | Kido | 455/38.3 |
| 5,995,559 A | * 11/1999 | Hedberg | 375/340 |
| 6,038,436 A | * 3/2000 | Priest | 455/343 |

FOREIGN PATENT DOCUMENTS

EP  0656693  6/1995

\* cited by examiner

*Primary Examiner*—Nay Maung
*Assistant Examiner*—Joy K. Contee
(74) *Attorney, Agent, or Firm*—Philip Wadsworth; Charles Brown; Bruce Greenhaus

(57) ABSTRACT

A system and method for reducing average idle current in a telecommunications system handset by decreasing the power when demodulation of the incoming signal and decoding of FOCC data stream is unnecessary is provided. The system and method supplant the need to decode all five repeated FOCC data words. The system performs various testing on each of the five data words as they are received. If the data words satisfy particular conditions, such as comprising control filler words or match one another based on the result of testing, no further processing of words occurs until the next sync is received and sleep mode is initiated. According to a further feature, the system may erase the sync/dotting sequence if and only if the prior sync word is successfully decoded. The system and method support both A and B slotting and power down components of the handset, such as RF circuitry and/or data sync timers.

28 Claims, 5 Drawing Sheets

SLOTTED IDLE MODE FOR DUAL MODE SUBSCRIBER STATIONS

BACKGROUND OF THE INVENTION

1. Field of the Invention

The present invention relates generally to telecommunications subscriber station data message processing, and more particularly to reducing idle current by selectively powering down the RF chain in the presence of a FOCC (forward control channel) data stream.

2. Description of the Related Art

Mobile telephone service using radio frequency (RF) transmission began in the United States in the late 1970's. Initially, service was based on analog (FM) radio transmission for voice and Frequency Shift Keying (FSK) modulation, along with pre-assigned analog channels for control and signaling. ESS switching and standard trunking technology was utilized to provide access to and from the Public Switched Telephone Network (PSTN). This technology is commonly referred to as Advanced Analog Mobile Phone System (AMPS). An AMPS system consists of a Mobile Telephone Switching Office (MTSO) which can control multiple cell sites or base stations. The MTSO and cell sites communicate over standard voice trunks as well as dedicated control data links.

The United States Telecommunications Industry Association (TIA) has adopted a set of standards for migrating the current analog (AMPS) system to a dual mode operating environment in which a digital cellular network co-exists with the present analog service.

This standard subdivides existing air (radio channels) into six TDMA (Time Division Multiple Access) slots over which voice and control data will be transmitted. The π/4 DQPSK (Differential Quadrature Phase Shift Keying) modulation scheme is used in this scheme, commonly referred to as AMPS-D. The AMPS-D standard supports use of two time slots per frame to achieve full-rate coded voice transmission at approximately an 8 Kbps (kilobits per second) rate. AMPS-D uses control messages embedded within the traffic channels to perform call-related functions, this data being Forward Control Channel (FOCC) data, which is sent from a base station in frames containing data blocks that are repeated five consecutive times. Additionally, a code division multiple access standard has been adopted, which also includes and AMPS mode for backwards compatibility. The standard is promulgated by the Telecommunications Industry Association (TIA), and is commonly referred to at the Interim Standard 95 (IS-95).

As with all mobile telecommunication systems, handset power performance is of primary concern. The longer the handset can operate without the need for supplemental power or recharging, the more attractive the handset is to consumers. Within the framework of the current dual mode operating scheme employing an AMPS or AMPS-D analog standard, overall handset power performance may be optimized by decreasing FM idle current, or the current required when FM is in standby. FM idle current may be decreased given current FM architectures generally in three ways. First, FM idle current may decrease when overall RF subsystem performance is improved, such as by optimizing improving mixer/IF performance over previous designs. Alternately, other digital subsystems may be enhanced which decreases the need for idle current, including software modifications or power management techniques. One constraint of the current AMPS or AMPS-D system is that mobile phones utilizing these standards employ even or odd data stringing, whereby depending on whether a user has an even or odd phone number, the user will receive messages on either the A string or the B string. In other words, a phone powered down during a string in which the phone is to receive data cannot power up fast enough to receive and will miss that data. Under these conditions, the handset receiving the forward control channel data cannot be powered down It is therefore an object of the current invention to provide a system for improving power consumption and overall power performance in a dual mode telephone handset employing the AMPS or AMPS-D standard including IS-95 as described above.

It is a further object of the current invention to provide power savings for a telephone handset receiving forward control channel (FOCC) data.

It is yet another object of the current invention to provide enhanced power performance for a telephone handset whereby existing known architecture and hardware are minimally affected.

SUMMARY OF THE INVENTION

According to the present invention, there is provided a system and method for reducing average idle current by decreasing the power in the RF stream when demodulation of the incoming signal and decoding of the forward control channel (FOCC) data stream is not necessary. The current inventive system takes advantage of the coding, transmission, and available a priori information about the FOCC to refrain from decoding the entire FOCC stream using FM slotting.

The present inventive system supports early completion of BCH decoding without the need to decode all five repeated 40 bit words received from the FOCC data stream. Rather than awaiting all five words of data in order to perform a full 3 of 5 evaluation, the inventive system disclosed herein begins an early evaluation to detect the validity of the received FOCC data. Initially the system fetches the initial data word. The system then assesses whether the first occurrence of the word is stored filler, or a control filler message. The presence of a control filler word may determined using a control filler mask. If the first occurrence of the word is stored filler, the system determines whether the word also passes CRC.

The land to mobile link provides control filler messages whenever no other message is required, and these control filler messages typically do not change for a given control channel. Observation of typical operational communication channels has shown that control filler messages occur over the FOCC channel approximately 80 per cent of the time. Moreover filler messages are discarded by the mobile as they convey no information.

The system stores the filler word if the CRC check is valid. Control filler messages may differ under certain conditions, but once a control filler message is received for a service in a particular geographic area, the form of the control filler message will be the same for subsequent transmissions. Thus the first time a control filler message is received by the handset, the handset must fully decode the entire control filler message. At each subsequent pass the contents of a control filler message are known and thus control filler messages may be discarded. Thus, the phone may sleep after the first filler message is properly received. If the first word is not a control filler the second occurrence of the data word is fetched, and the system evaluates whether the first fetched word is identical to the second fetched word, and whether a CRC pass occurs. This determination implicitly requires a BCH decode. If a CRC pass occurs the phone enters sleep mode. Sleep mode is a reduced power mode where receive processing is suspended until the next redetermined wake up period. The wake up period typically corresponds to the next paging slot. If either condition is not true, the system proceeds to fetch the third data word in the sequence.

The system then performs a majority after 3 evaluation, which evaluates the three words received to determine whether they are identical. If so, the system performs a BCH decode and, as with the first two evaluations, ceases further processing on the five data words and indicates sleep mode is appropriate.

Otherwise, the system fetches the fourth repeat of the data word. The system then assesses whether a bitwise majority of the four data words received match one another. Bitwise majority after 4 testing is similar to majority after 3 testing, but evaluates whether 4 bitwise majority has been reached and if so terminates decoding and sleeps. As with the other evaluations, this evaluation may be bypassed or disabled if desired.

Subsequent to this evaluation, assuming majority after 4 testing is negative, the fifth and final repeat of the data word is obtained. Further processing is provided to perform appropriate BCH decoding and storage of newly received control filler words, as well as setting BCH decode flags.

Each word block of a word received from the FOCC data stream begins with a 10 bit dotting sequence followed by an 11 bit sync word. The system typically declares a loss of synchronization if five successive sync words are incorrect. To further reduce active slot time, the system may erase the sync/dotting sequence if and only if the prior sync word is successfully decoded.

Sleep generation is the process of determining when the system, or a portion of the system, can be powered down under the arrangement described above. For each decode stream having A and B data, five slot cycles are supported correspond to the 5 repetitions of the transmitted 40 bit code word. The system must decode each slot to determine the slot is not a filler word.

When stream A slotting is mandated, and a one word slot determines the presence of remaining of the filler word. The system provides a power out condition in the presence of a control filler word until all five words have been received. The occurrence of an early decode assert in any of the first four word slots provides a power out condition, or sleep indication. The system then provides a power up indication during repeat word five such that the system will have sufficient warm up time to receive the next sync word if it is to be decoded, otherwise he data warm up timer goes high prior to receiving the next set of data to provide sufficient warm up time to receive data.

The system must decode each slot for a given stream A or B until the message can be decoded using one or more of the previously described early decode criterion otherwise all 5 repetitions of the data are decoded. In the stream B slotting condition, power down indication occurs on successful early decode of the message. The power up indication occur prior to the next sync if it is to be decoded or prior to the first repeat of the next message of stream B.

Other objects, features, and advantages of the present invention will become more apparent from a consideration of the following detailed description and from the accompanying drawings.

DETAILED DESCRIPTION OF THE INVENTION

The present inventive system reduces average idle current by decreasing the power in the RF stream when demodulation of the incoming signal and decoding of the forward control channel (FOCC) data stream is not necessary. Unlike many other standards, such as IS95, the control channel in AMPS is not designed to support slotted mode. However, the current system takes advantage of the coding, transmission, and available a priori information about the FOCC to refrain from decoding the entire FOCC stream using FM slotting.

The efficiency of slotting is a function of the active duty cycle for demodulation and decoding of FOCC data and selection of particular subsystems for power reductions during preselected intervals.

The FOCC data stream consists of interlaced A data/B data streams having even/odd MINS. The A stream and B stream are time division multiplexed along with a busy-idle (B/I) data stream. An FOCC word includes 28 information bits encoded into a (40, 28, 5) BCH (Bose-Chaudhui-Hocquenghem) decoding arrangement. Each 40 bit FOCC word repeats five times, and these five repetitions form a word block. The interval of each repeated word is referred to as a slot. An n-word slot represents the first n-repeats of the word and an 11 bit word sync sequence is sent to the mobile station to synchronize the mobile station with the incoming data.

Figure 1:
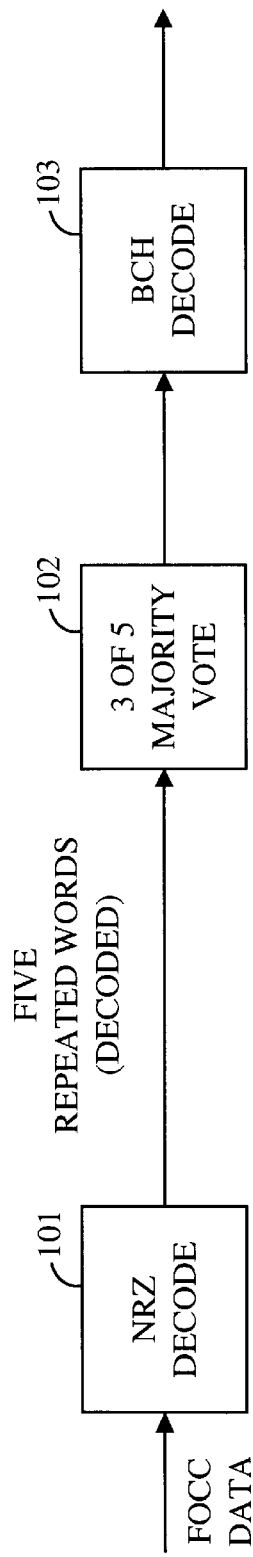
FIG. 1 illustrates a prior system for decoding FOCC data.

A typical decoding arrangement for the FOCC data stream word is illustrated in FIG. 1. The first decoding step is NRZ (non return to zero) decoding 101, which decodes the five repeated 40-bit data words in the FOCC data stream. Subsequently the system performs a 3 of 5 majority vote in block 102. Three (3) of 5 majority voting consists of receiving all five decoded words and evaluating for each bit position of the 40 bit word the majority bit decision. The majority decoder outputs a zero for 30 or more zeros out of 5 and inputs a one for 3 or more ones out of 5. This arrangement then performs a BCH decode in block 103. BCH decoding in the arrangement illustrated in FIG. 1 is typically limited to multi-bit error detection and single bit error correction. A BCH decode that is error free is referred to a CRC pass.

The present inventive system supports early completion of the BCH decode without the need to decode the full five repeated 40 bit words. The present invention will be described with respect to the AMPS specification, but it should be understood that the invention is equally applicable to any arrangement which receives FOCC data, such as TACS, ETACS and JTACS.

In a manner analogous to CDMA slotted-idle mode, the average idle current can be reduced under certain conditions based on a priori knowledge about the FOCC receiving process by powering down components in the RF chain during intervals when demodulation and decoding of the FOCC data stream is not required. Unlike CDMA, the control channel such as the channel in the AMPS arrangement was not designed to support a "slotted" mode. By taking advantage of the coding structure of FOCC data stream and using a priori information, it becomes unnecessary to fully decode all of the FOCC data stream, thus allowing powering down of components, such as RF circuitry, during intervals when not decoding. This technique is called FM slotting.

The efficiency of slotting is a function of the active duty cycle and the ability to power down as many subsystems or components during the slot intervals as possible.

Typical hardware currently available on AMPS telecommunications handsets provides for RF warmup times of approximately 3 ms, and thus the architecture will support a low-power state for virtually all circuits. The present slotted mode invention for improved idle performance is applicable to, but not limited to, demod architecture such as quad-demodulation.

Figure 2:
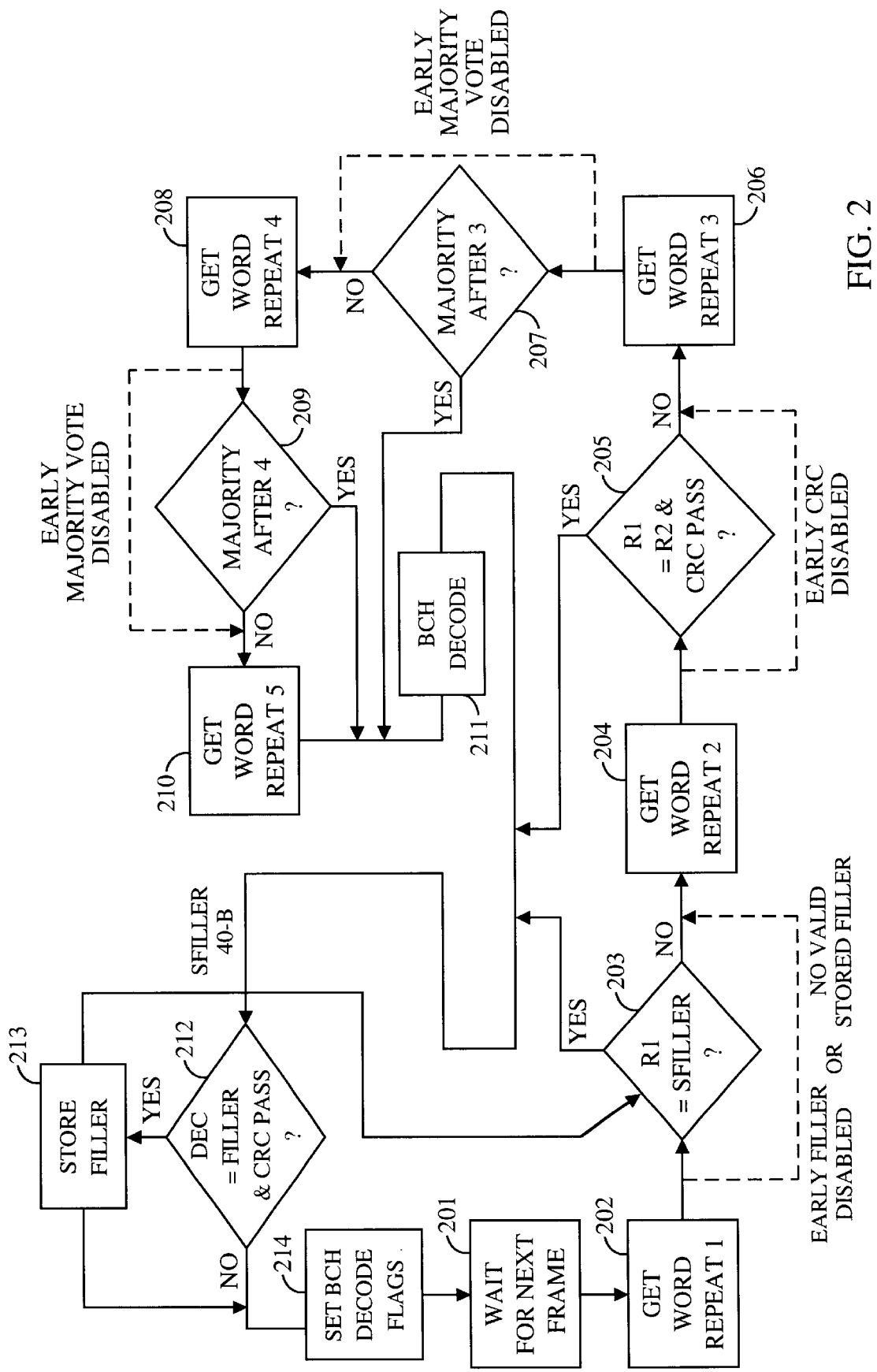
FIG. 2 is a diagram of the processing for the current invention.

A diagram of the flowchart for the current invention is presented in FIG. 2. Rather than awaiting data for a full 3 of 5 evaluation, the system illustrated in FIG. 2 begins an early evaluation to detect the validity of the received FOCC data. Initially the system is awaiting data in await data block 201. First occurrence of the word is fetched in block 202. Evaluation block 203 assesses whether the first occurrence of the word is stored filler. The stored filler is previously decoded control filler message for a given FOCC channel which has been stored for the purpose of comparison in order to detect a filler message based on a single repetition decoder. If the first occurrence of the word is stored filler, the system passes to decision block 212 to see whether the word also passes CRC, discussed below. If the first repeat matched the previously decoded filler it not only indicates a filler message but the decoded repeat posses the CRC for the bitwise comparison including the CRC bits which were already determined to be correct for the stored filler.

With respect to early stored filler evaluation, it is important to note that FOCC channel data includes mobile station control messages (such as page messages), overhead messages, and control filler messages. The land to mobile link provides control filler messages whenever no other message is required, and these control filler messages typically do not change for a given control channel. If the control filler was to change the new filler message would be decoded or overwrites the previous filler. The fact that the filler messages change infrequently is key to the efficiency of this approach. Control filler messages have parameter fields which include CMAC, access channel power level, and WFOM (wait for overhead message before access). Observation of typical operational communication channels has shown that control filler messages occur over the FOCC channel approximately 80 per cent of the time. In other words, four out of every five messages received by the mobile handset are control filler messages. Thus evaluation block 203 operates by first determining whether the first repeat bit in the word retrieved in block 202 exactly matches the last error free decoded control filler message.

The system only stores the filler word if the CRC check is valid. Control filler messages may differ under certain conditions, but once a control filler message is received for a service in a particular geographic area, the form of the control filler message will be the same for subsequent transmissions. Thus the first time a control filler message is received by the handset, the handset must fully decode the entire control filler message, and block 203 is bypassed, as indicated by the no valid stored filler wording. At each subsequent pass the contents of a control filler message are known and thus control filler messages may be discarded.

In operation, the stored filler is tagged invalid until a filler is successfully decoded. The system bypasses the early filler test if the filler is tagged invalid. The stored filler is also tagged invalid when the mode changes from FOCC to Forward Voice Channel (FVC). Forward Voice Channel data is an alternate means for sending data from a base station, having a format containing 40 bits and repeated 11 times together with a 37 bit dotting and 11 bit word sequences. Such a switch disables the ability to decode control filler mask fields.

Control filler words have a specific format. A control filler word can be determined using the following control filler mask:

| 11 | xx | 010111 | xxxxx | 11 | xx | 1 | x | 1111001 | xxxxxxxxxxxx |
|----|----|--------|-------|----|----|---|---|---------|--------------|

An x represents a don't care bit. The filler word is only stored on a CRC pass.

On initialization, the system tags the stored filler word invalid. The stored filler word remains tagged invalid until the system successfully decodes a filler word. This early filler test, shown in FIG. 2 as block 203, is bypassed if the system has tagged the filler invalid. Upon a mode change, such as from FOCC to FVC, the system resets the wideband data block as well as the frame synchronizing circuitry. The filler word is set invalid on such an event until a filler is successfully decoded on a new channel. The wideband data block and particularly the frame sync circuit is reset on a mode change The early control filler evaluation of evaluation block 203 is a 40 bit non-masked comparison of incoming data with a stored filler message, and thus the evaluation implicitly checks CRC passes.

From FIG. 2, a bypass is provided for evaluation block 203 in the event that this step is not desired. The second occurrence of the word is fetched at block 204, and block 205 evaluates whether the first fetched word is identical to the second fetched word, and whether a CRC pass occurs, which implicitly includes performance of a BCH decode within block 205. A bypass is provided if this early CRC evaluation is not desired. If the BCH decode within block 205 is error free, the system considers this a CRC pass and passes to block 212. If either condition is not true, i.e. either the first and second words are not identical or the BCH decode has errors, then the system proceeds onto block 206 wherein the third word in the sequence is fetched.

Majority after 3 block 207 evaluates whether the three received messages are identical. In this situation, majority__sum (n,k) represents the hamming weight (binary sum) for the k-th bit position (k=0, 1, . . . 39) after the n-th repeat of the word, where n equals 3. An early majority vote over all k for three words received is declared if:

Equivalent the three repeats are identical $$(majority\_sum(3,k)!=2) OR (majority\_sum(3,k)!=1)$$

These are bitwise tests. Again, the ability to disable or bypass majority after 3 block 207 is provided if this feature is not desired.

If a majority exists after three words, the system transitions to BCH decode block 212. Otherwise, the system passes to fetching the fourth repeated word in block 208. The next decision is in majority after 4 block 209, wherein the system assesses whether a bitwise majority has been reached within the four data words independent of the repeat. Majority after 4 block 209 is similar to majority after 3 block 207, but performs the evaluation:

majority_sum(4,k)!=2

Or equivalently if majority_sum (4,k)=2 this implies two zeros and two ones have been decoded for at least one bit position and therefore the fifth repetition required to decode a majority. Again, as indicated in FIG. 2, the operation of this block may be disabled.

Using early majority voting, no degradation in performance occurs because voting terminates only when additions repeat and will not affect the result.

Subsequent to majority after 4 block 209, if the result from majority after 4 block 209 is negative, the fifth and final repeat of the word is obtained in block 210. Output from blocks 210, 209, and 207 are BCH decoded in block 211 and pass to block 212. If the received word is a filler word at any point during decoding and a CRC pass occurs, the filler word is stored in block 213 and passes to block 203 for evaluation of further words based on the most current filler word available. Once the filler word is stored or the system determines that both the existence of a filler word and a CRC pass occurred, the system passes to block 214, wherein BCH decode flags are set and the system repeats awaiting the next frame in block 201.

Each word block begins with a 10 bit dotting sequence followed by an 11 bit sync word. The dotting sequence ensures that the phase ambiguity of the Manchester stream may be resolved by the system. Sync dotting is a pattern included in the data stream to assist the decoder to determine framing. The sync word provides frame, or word block, alignment time as well as frame acquisition. The system declares frames to be synchronized after two successive sync words have been decoded, when separated by the word block length of 463 bits. The system declares a loss of synchronization if five successive sync words are incorrect.

To further reduce active slot time, the system may avoid decoding the sync/dotting sequence if and only if the prior sync word is successfully decoded. Sync/dotting erasure when the prior sync word has been successfully decoded reduces the active duty cycle approximately ten percent. Further, sync/dotting erasure minimizes the difference between the A and B stream slotting.

Sleep generation is the time when the system can be powered down under the arrangement described above. For each decode stream having A and B data, five slot cycles are supported. Slot cycles correspond to the following arrangement:

| | |
|---|---|
| 1 word slot | early control filter |
| 2 word slot | early CRC |
| 3 word slot | majority after 3 |
| 4 word slot | majority after 4 |
| 5 word slot | other (including slotting disabled) |

Figure 3:
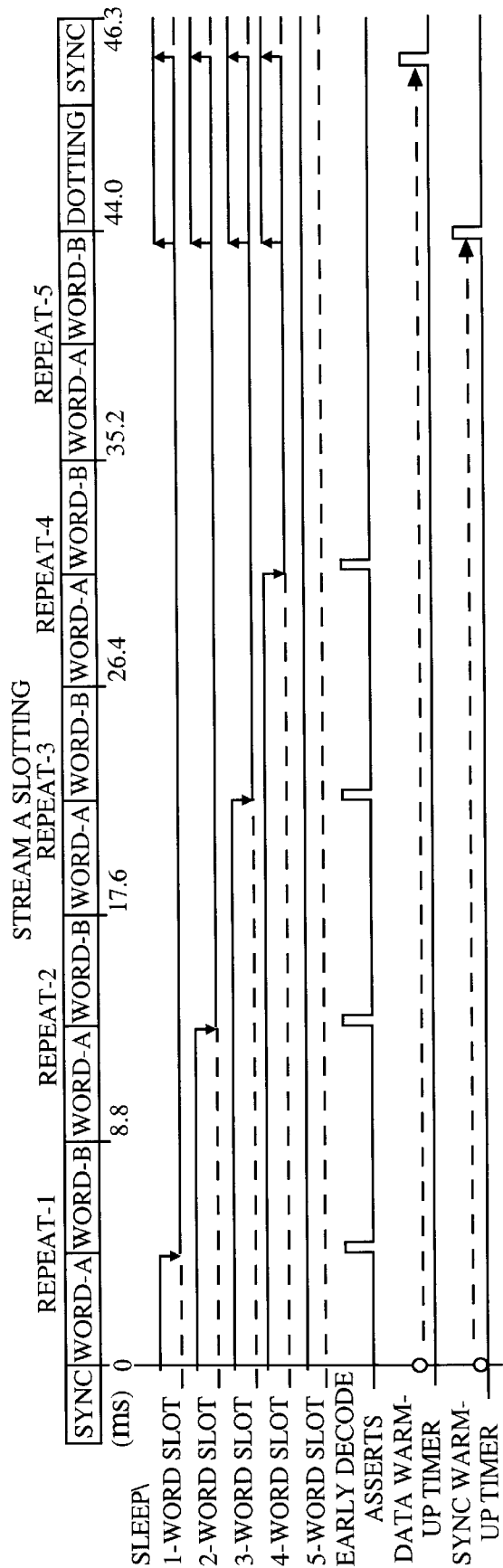
FIG. 3 presents timing diagrams for sleep generation according to the teachings of the present invention.
Figure 3:
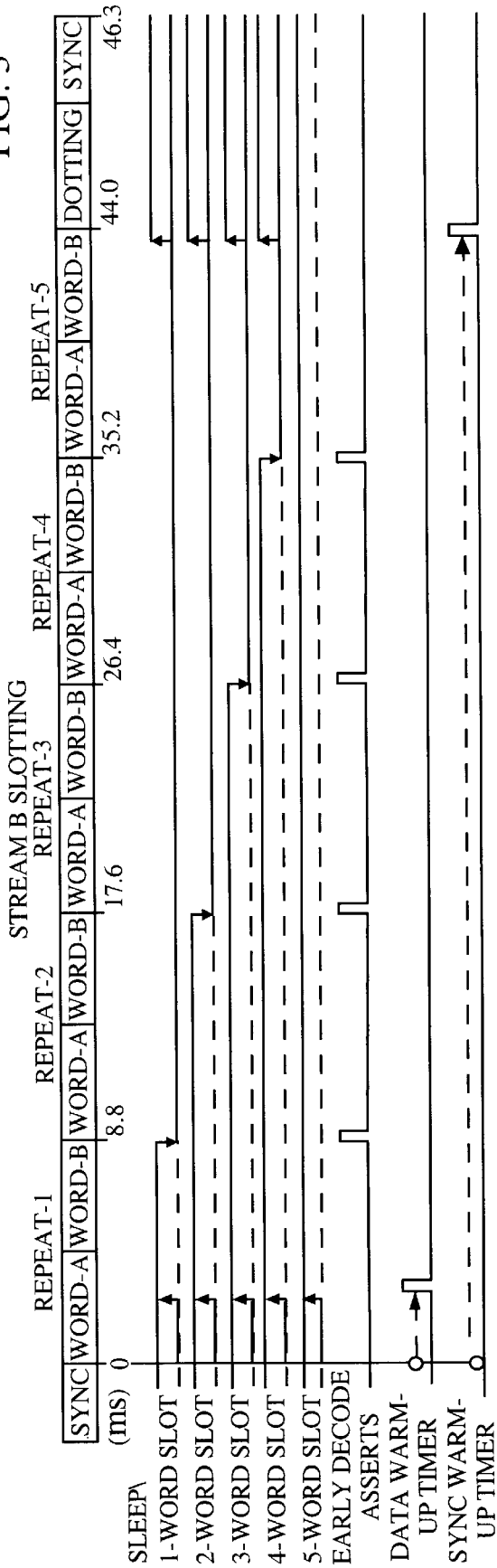

Timing diagrams for sleep generation are illustrated in FIG. 3. As shown therein, sleep transitions from high (awake) to low (sleep) on generation of an early decode assertion. The transition from low to high on the time out of either the data warm up timer or the sync warm up timer. Both timers are reset at the beginning of the word block. The beginning of the word block is the B/I, or busy/idle, bit at the beginning of the first repeat of word A as shown in FIG. 3. The data warm up timer provides sufficient RF warmup time to ensure reliable decode of the beginning of the slotting sequence. The system masks the sync warmup time out if the previous sync word is decoded error free. Masking under this condition implies that the bad sync count is zero and the previous sync was not erased. The bad sync count is the count of the number of successive sync counts decoded in error. As described above where the bad sync count reaches 5, loss of sync is declared and the decoder must reacquire.

FIG. 3 illustrates stream A slotting as well as stream B slotting pursuant to the current invention. From FIG. 3, a sync block is received, followed by a B/I bit, and then the first repeat of the word, comprising word A and word B, are received by the system. The time taken to receive the entire first repeat word for A and B streams is 8.8 milliseconds. The first repeat word comprises four ten bit words interlaced with four B/I bits in each of the word A and word B portions of the repeat word. These 88 bits take 8.8 milliseconds. As shown, for the five word slot arrangement, the system does not sleep, or is always powered on, so the system does not realize any performance gain. When stream A slotting is mandated, and a one word slot determines the early filler word occurs as shown in block 202, the system provides a power out condition until all five words have been received. The occurrence of an early decode assert in any of the first four word slots provides a power out condition, or sleep indication. The system then provides a power up indication during repeat word five such that the system will have sufficient warm up time to receive the next sync. Further, the data warm up timer goes high prior to receiving the next set of data to provide sufficient warm up time to receive data. Note that each of the four potential early decode asserts in the case of stream A slotting occur at the end of the receipt of the A word, and the system provides sleep or power out condition indication after the A word has been received.

In the stream B slotting condition, the power down indication occurs upon receipt of each respective B word in the data stream, i.e. at early decode asserts during the receipt of the repeat words. Since the sync occurs at the same point in time, the sync warm up timer indicates a power up condition at the 41 millisecond point. Assuming 3 ms warm up, the data warm up timer indicates data power up during repeat word one word A.

As shown in these timing diagrams, the time to receive the five repeat words, the dotting sequence, and the sync word is 46.3 milliseconds. The maximum power down indication time period is approximately 32 milliseconds. With control fillers received approximately 80 per cent of the time, 80 per cent of the sequences may be able to take advantage of the 32 millisecond power down condition during each 46.3 millisecond frame. The ability to power up and power down particular components within the handset determines the overall efficiency of the system.

Based on the timing diagrams of FIG. 3, the active slot cycle is summarized in the following table. The erased sync word condition corresponds to masking of the sync warm up time out. Slot cycles are outlined according to Td, or power down (turn off) time, or Tw, power up (warm up) time. Td represents the turn off times in the receive chain, which generally represents the longest component turn off time in a handset. Tw is generally the longest warm up time in the handset chain, typically the time necessary for the data/sync timers to power up the receive chain. As may be appreciated by one of ordinary skill in the art, the timing included in FIG.

3 and the following table may be altered depending on the power up and power down times of various components while still within the scope of the invention. In particular, it is noted that individual components may be powered up or down at a more rapid rate than other components, and components which are rapidly powered up and/or down may be off longer than other components. Thus software or hardware may be readily designed to power down individual components longer than others, again within the scope of the current invention.

|  | Decoded Sync Word | | Erased Sync Word | |
| --- | --- | --- | --- | --- |
|  | A | B | A | B |
| 1-word slot | 6.7 + Tw + Td | 11.1 + Tw + Td<br>6.7 + 2Tw + Td* | 4.4 + Tw + Td | 8.8 + Td |
| 2-word slot | 15.5 + Tw + Td | 19.9 + Tw + Td<br>15.5 + 2Tw + Td* | 13.2 + Tw + Td | 17.6 + Td |
| 3-word slot | 24.3 + Tw + Td | 28.7 + Tw + Td<br>24.3 + 2Tw + Td* | 22.0 + Tw + Td | 26.4 + Td |
| 4-word slot | 33.1 + Tw + Td | 37.5 + Tw + Td<br>33.1 + 2Tw + Td* | 30.8 + Tw + Td | 35.2 + Td |
| 5-word slot | 46.3 | 46.3 | 46.3 | 46.3 |

*under these conditions the sync has been erased from the previous frame

For implementation purposes, sleep timing generation is slaved to the WBD (wideband data) message decode block to ensure that the receive chain is enabled, or powered, for the active decode slots as defined above. The sleep generation circuit may be any common implementation of such a circuit, such as the MSM3000 ASIC available from QUAL-COMM Incorporated, San Diego, Calif.

Figure 4:
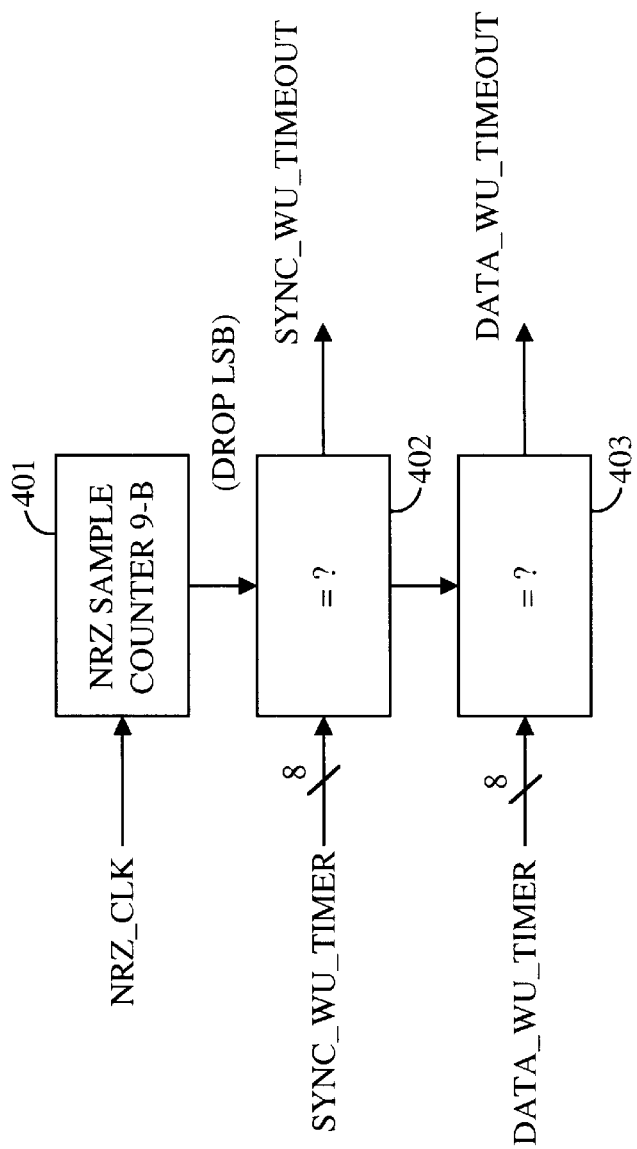
FIG. 4 illustrates the data receipt and warm up timing hardware.
Figure 5:
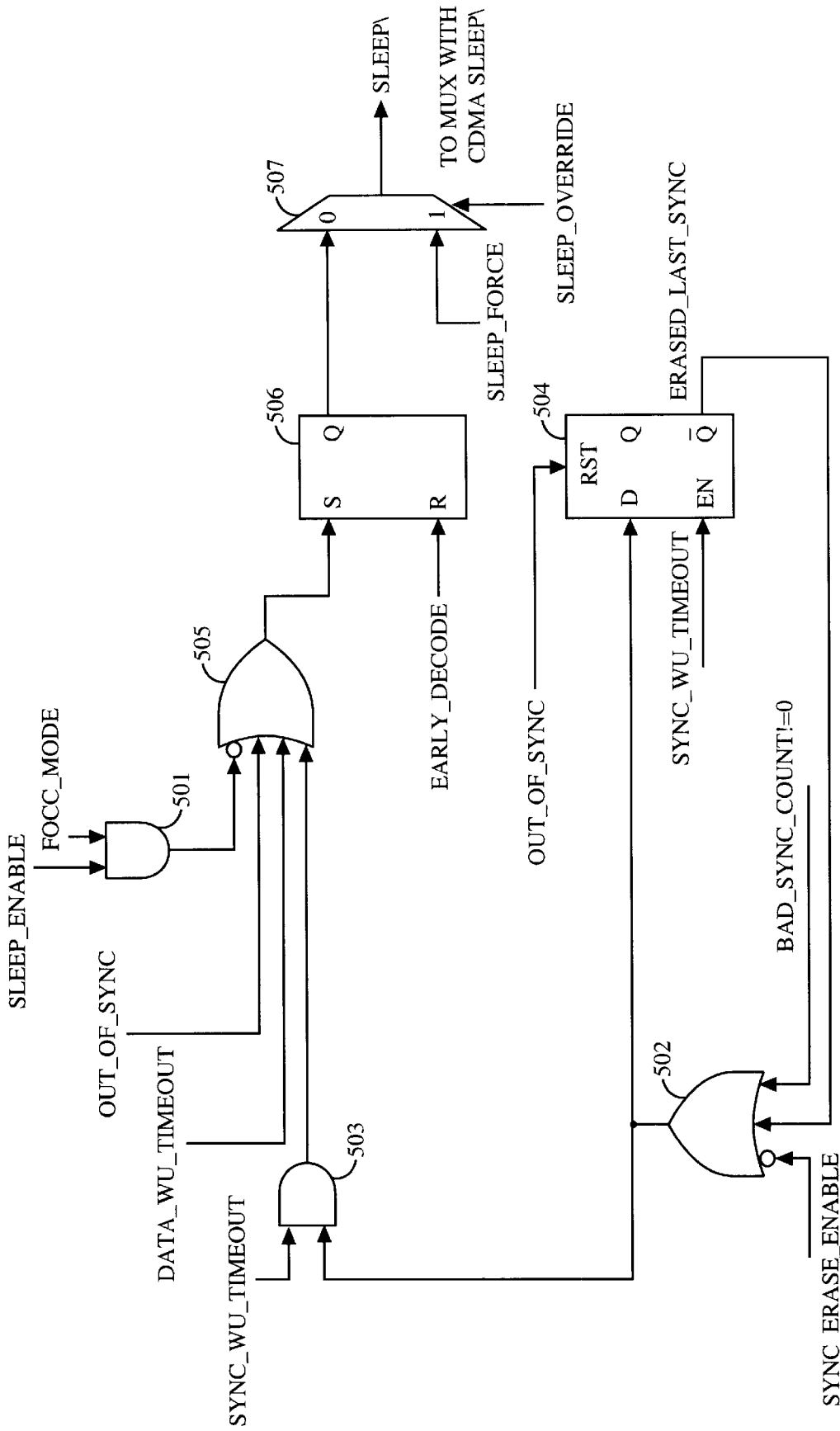
FIG. 5 illustrates a hardware implementation of the current invention.

Illustrations of the hardware used to implement the current invention are illustrated in FIGS. 4 and 5. FIG. 4 represents the timing setup circuitry, with block 401 illustrating a 9 bit NRZ (non-return to zero) sample counter, block 402 an evaluation of sync warmup time, and block 403 an evaluation of data warmup timing. Blocks 402 and 403 receive 8 bit timer values, while the ninth bit from block 401 is dropped and results sequentially passed from block 401 to block 402 to block 403. When the sample count equals the timer values, timeout pulses are generated for the purpose of defining the wakeup times. The resultant sync warmup timeout and data warmup timeout pass to the circuit presented in FIG. 5.

FIG. 5 represents the circuit which determines sleep based on various inputs. AND gate 501 receives the sleep enable and FOCC mode indications. OR gate 502 receives the sync erase enable signal (inverted) and the indication that the bad sync count does not equal zero. Data from OR gate 502 passes to AND gate 503 which combines the result from OR gate 502 and the sync warmup timeout from block 402 of FIG. 4. The output of OR gate 502 also passes to element 504, which receives the out of sync indication, sync warmup timeout indication, and the output of OR gate 502 and feeds an erased last sync signal back to OR gate 502. The output from AND gate 503 passes to OR gate 505, which also receives data warmup timeout from block 403 of FIG. 4, the out of sync indication, and the output from AND gate 501. The output of OR gate 505 is provided with the early decode signal to flip flop 506. The output of flip flop 506 is multiplexed as shown in multiplexor circuit 507 with the sleep force indicator and sleep override signal to produce the sleep signal. The sleep signal is multiplexed with the CDMA sleep signal in dual mode phones. Note that in the implementation shown the out of sync, bad sync count, and early decode signals are received from the WBD (wideband data) decode block of the handset.

The assertion of sleep mode is triggered upon an early decode. For a typical processing sequence the power down transition does not need to be delayed. The system triggers deassertion of sleep on time out of the sync and data warm up timers. The data warm up timer always deasserts sleep, whereas the sync warmup timer only deasserts sleep if the system erased the previous sync word or the bad sync count is not zero. This allows decode of the next sync word in order to determine if the system is still in sync. Sync timer assertion follows a valid decode of the sync word of the next frame. The timers are programmable so as to minimize the sleep interval while providing sufficient warm up time to ensure the RX chain and control loops have stabilized prior to decode of the next active slot.

The system automatically overrides the sleep circuit if the system loses synchronization. On such an event sleep mode is deasserted until sync is reacquired. The system provides manual override of the sleep mode to ensure reliable decoding of the busy/idle stream for busy detection and seizure detection for RECC messaging. The system provides mode override to enable sleep in the FOCC mode.

Sync word erasure increments a bad sync counter, and the system resets the bad sync counter by erasing false detections if a last erased sync indication is asserted. Similarly, the system increments the sync count on erasure of sync words.

Figure 6:
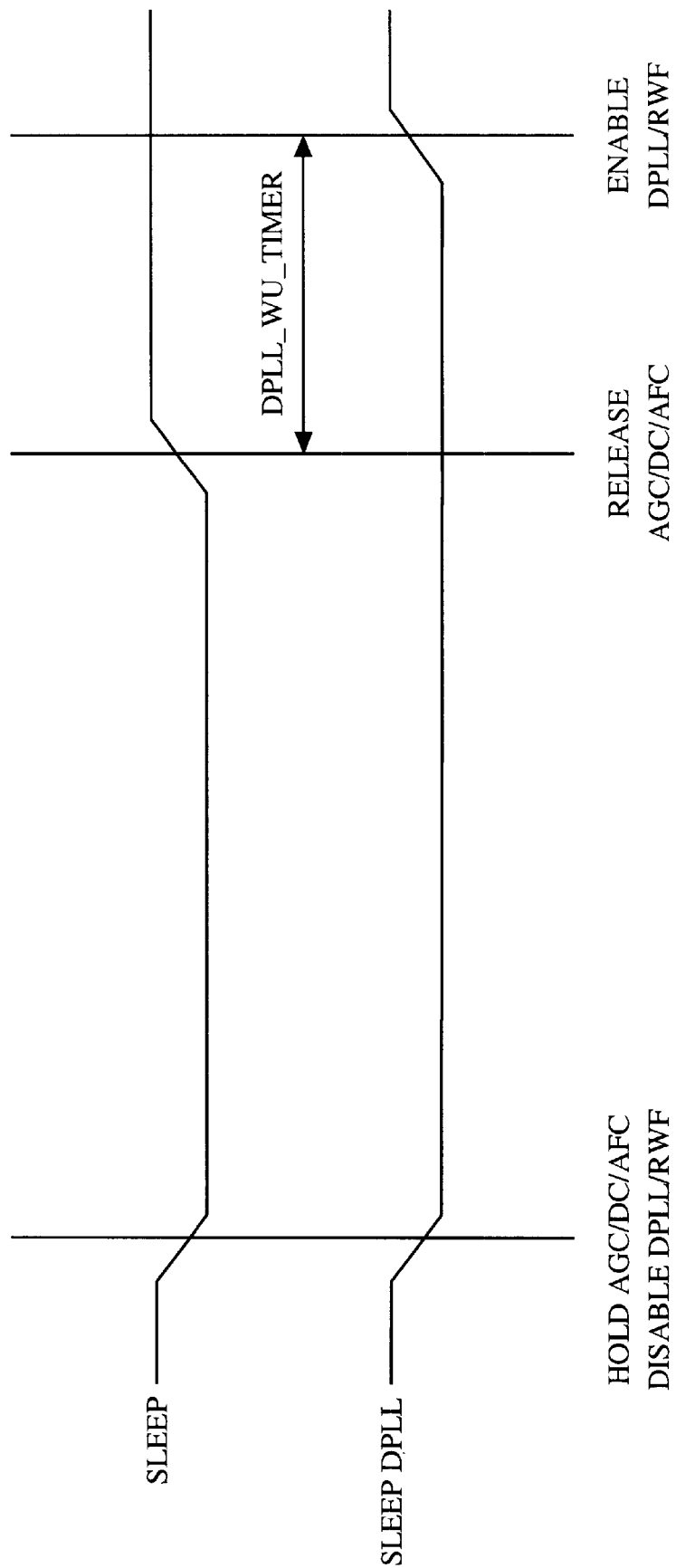
FIG. 6 represents the timing associated with the implementation of the current system.

On assertion of sleep, the timing recovery DPLL (digital phase lock loop) must maintain timing for the system even though the DPLL demodulation signal is invalid. The system masks the DPLL input to disable all phase error updates of the loop. The DPLL phase accumulator is not disabled, but left free running. The running DPLL phase accumulator affords the system the ability to generate the Manchester and NRZ clock during the sleep interval. DPLL timing is aligned to the sleep DPLL signal as shown in FIG. 6. The system delays the deassertion of sleep DPLL with respect to the sleep signal according to the DPLL wakeup timer. This feature permits masking of invalid samples during RX chain warmup.

During the sleep interval the NRZ clock is left running to permit continuous decode of the NRZ data stream.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method for reducing average idle current in a handset receiving forward control channel data, said forward control channel data comprising a plurality of data words, each forward control channel word comprising a dotting sequence and a sync word, said method comprising the steps of:

receiving a first word of the forward control channel data;

determining whether the first word of the forward control channel data comprises a control filler message;

powering down a predetermined component of the handset for a predetermined period of time based on the results of said determining step;

receiving a second word of the forward control channel data;

judging whether the first word and second word of the forward control channel are identical;

performing a decoding operation on the two forward control channel data words;

erasing said dotting sequence and sync word of a selected forward control channel word if and only if a prior sync word of a prior forward control channel word is successfully decoded; and powering down a predetermined component of the handset for a predetermined period of time based on the results of said judging step and said performing step.

2. The method of claim 1, further comprising the steps of:

receiving a third forward control channel data word;

evaluating whether the three forward control channel data words are identical; and powering down a predetermined component of the handset for a predetermined period of time based on the results of said evaluating step.

3. A method for reducing average idle current in a handset receiving forward control channel data, said forward control channel data comprising a plurality of data words, said method comprising the steps of:

receiving a first word of the forward control channel data;

determining whether the first word of the forward control channel data comprises a control filler message;

powering down a predetermined component of the handset for a first predetermined period of time based on the results of said determining step;

receiving a second word of the forward control channel data;

judging whether the first word and second word are identical;

performing a decoding operation on the two forward control channel data words;

powering down the predetermined component of the handset for a second predetermined period of time based on the results of said judging step and said performing step;

receiving a third forward control channel data word;

evaluating whether the three forward control channel data words are identical; and powering down the predetermined component of the handset for a third predetermined period of time based on the results of said evaluating step;

receiving a fourth forward control channel data word;

ascertaining whether three of the four forward control channel data words are identical; and powering down the predetermined component of the handset for a fourth predetermined period of time based on the results of said ascertaining step.

4. The method of claim 1, further comprising the step of:

storing each data word determined to comprise a control filler message.

5. The method of claim 1, further comprising the step of:

detecting a control filler word using a predetermined bit mask.

6. The method of claim 1, further comprising the steps of:

providing for the bypassing of said determining step under predetermined conditions; and providing for the bypassing of said judging step under predetermined conditions.

7. A method for reducing average idle current in a receiver of forward control channel data, said forward control channel data comprising a plurality of data words, each data word comprising a dotting sequence and a sync word, said method comprising the steps of:

receiving an initial data word;

determining whether said initial data word sufficiently matches a predetermined filler word;

erasing said dotting sequence and sync word of a selected data word if and only if a prior sync word of a prior data word is successfully decoded; and reducing electrical flow to a predetermined component associated with said receiver for a predetermined period of time when said initial data word sufficiently matches said predetermined filler word.

8. The method of claim 7, further comprising the steps of:

receiving a second data word;

judging whether the initial data word and the second data word are identical;

performing a decoding validity assessment on the initial data word and the second data word; and reducing electrical flow to a predetermined component associated with said receiver for a predetermined period of time when said initial data word and said second data word are identical and the initial data word and second data word have been validly decoded.

9. The method of claim 8, further comprising the steps of:

receiving a third data word;

evaluating whether the three received data words are identical; and reducing electrical flow to a predetermined component associated with said receiver for a predetermined period of time when said three data words are identical.

10. The method of claim 7, wherein said determining step comprises detecting the predetermined filler word by comparing said initial data word with a predetermined bit mask.

11. The method of claim 9, further comprising the steps of:

receiving a fourth data word;

ascertaining whether three of the four received data words are identical; and reducing electrical flow to a predetermined component associated with said receiver for a predetermined period of time when three of the four received data words are identical.

12. The method of claim 7, further comprising the step of:

storing each message determined to be a control filler message.

13. The method of claim 7, further comprising the step of:

providing for the bypassing of said determining step under predetermined conditions.

14. The method of claim 8, further comprising the step of:

providing for the bypassing of said judging step under predetermined conditions.

15. A method for reducing average idle current in a receiver of forward control channel data, said forward control channel data comprising a plurality of data words characterized by a dotting sequence and a sync word, said method comprising the steps of:

receiving an initial data word and a second data word;

judging whether the initial data word and the second data word are identical;

providing for the bypassing of said judging step under predetermined conditions;

performing a decoding validity assessment on the initial data word and the second data word;

erasing an associated dotting sequence and sync word of a data word if and only if a prior sync word of a prior data word is successfully decoded; and reducing electrical flow to a predetermined component associated with said receiver for a predetermined period of time when said initial data word and said second data word are identical and the initial data word and second data word have been validly decoded.

16. The method of claim 15, further comprising the steps of:

determining whether said initial data word sufficiently matches a predetermined filler word; and reducing electrical flow to the predetermined component associated with said receiver for a second predetermined period of time when said initial data word sufficiently matches said predetermined filler word;

wherein said determining step and step of reducing the electrical flow for a second predetermined period occur prior to receiving said second data word.

17. The method of claim 16, further comprising the steps of:

receiving a third data word;

evaluating whether the three received data words are identical; and powering down a predetermined component of the handset for a predetermined period of time when said three data words are identical.

18. The method of claim 16, wherein said determining step comprises detecting the predetermined filler word by comparing said initial data word with a predetermined bit mask.

19. The method of claim 17, further comprising the steps of:

receiving a fourth data word;

ascertaining whether three of the four received data words are identical; and powering down a predetermined component associated with the receiver for a predetermined period of time based on the results of said ascertaining step.

20. The method of claim 16, further comprising the step of:

storing each message determined to be a control filler message.

21. The method of claim 16, further comprising the step of:

providing for the bypassing of said determining step under predetermined conditions.

22. A method for reducing average idle current in a receiver of forward control channel data words, wherein each data word received comprises a dotting sequence and a sync word, said method comprising the steps of:

receiving a plurality of forward control channel data words; and erasing said dotting sequence and sync word of a selected data word if and only if a prior sync word of a prior data word is successfully decoded.

23. A telecommunications system for receiving and decoding forward control channel data, said forward control channel data comprising a plurality of data words, said system comprising:

means for receiving a first data word;

means for determining whether said initial data word sufficiently matches a predetermined filler word;

means for reducing electrical flow to a predetermined component within the telecommunications system for a first predetermined period of time when said initial data word sufficiently matches said predetermined filler word;

means for receiving a second data word;

means for judging whether the first data word and the second data word are identical;

means for performing a decoding validity assessment on the first data word and the second data word;

means for reducing electrical flow to the predetermined component associated with said receiver for a second predetermined period of time when said first data word and said second data word are identical and the first data word and second data word have been validly decoded means for receiving a third data word;

means for evaluating whether the three received data words are identical;

means for reducing electrical flow to the predetermined component of the telecommunications system for a third predetermined period of time when said three data words are identical means for receiving a fourth data word;

means for ascertaining whether three of the four received data words are identical; and means for powering down the predetermined component associated with the telecommunications system for a fourth predetermined period of time based on whether three of the four received data words are identical.

24. The telecommunications system of claim 23, wherein said determining means comprises means for detecting the predetermined filler word by comparing said initial data word with a predetermined bit mask.

25. The telecommunications system of claim 23, further comprising means for storing any initial data word determined to be a control filler message.

26. The telecommunications system of claim 23, wherein each data word received comprises a dotting sequence and a sync word, said telecommunications system further comprising:

means for erasing said dotting sequence and sync word of a selected data word if and only if a prior sync word of a prior data word is successfully decoded.

27. The telecommunications system of claim 23, further comprising:

means for providing for the bypassing of said determining step under predetermined conditions.

28. The telecommunications system of claim 23, further comprising:

means for providing for the bypassing of said judging step under predetermined conditions.

* * * * *